United States Patent
Tsai et al.

(10) Patent No.: US 7,350,094 B2
(45) Date of Patent: Mar. 25, 2008

(54) METHOD AND DEVICE FOR ULTRAWIDEBAND FREQUENCY TRACKING

(75) Inventors: Wen-Fu Tsai, Kaohsiung (TW); Chien-Chih Lin, Taipei (TW); Shih-Chieh Chang, Taipei (TW)

(73) Assignee: Genesys Logic, Inc., Taipei County (TW)

( * ) Notice: Subject to any disclaimer, the term of this patent is extended or adjusted under 35 U.S.C. 154(b) by 290 days.

(21) Appl. No.: 10/942,891

(22) Filed: Sep. 17, 2004

(65) Prior Publication Data

US 2005/0057295 A1  Mar. 17, 2005

(30) Foreign Application Priority Data

Sep. 17, 2003   (TW) ............................... 92125574 A

(51) Int. Cl.
*G06F 1/00* (2006.01)
(52) U.S. Cl. ........................................ 713/500; 331/44
(58) Field of Classification Search ................ 713/500; 331/44
See application file for complete search history.

(56) References Cited

U.S. PATENT DOCUMENTS

| | | | | |
|---|---|---|---|---|
| 4,998,075 A | * | 3/1991 | Patton et al. ................... 331/2 |
| 5,686,864 A | * | 11/1997 | Martin et al. ................. 331/1 A |
| 5,796,312 A | * | 8/1998 | Hull et al. ..................... 331/44 |
| 6,297,705 B1 | * | 10/2001 | Williams et al. ............... 331/44 |
| 6,407,641 B1 | * | 6/2002 | Williams et al. ............ 331/1 A |
| 6,415,342 B1 | * | 7/2002 | Wahl et al. ................... 710/100 |
| 6,928,540 B2 | * | 8/2005 | Chang ............................ 713/1 |
| 6,946,920 B1 | * | 9/2005 | Williams et al. ............... 331/44 |
| 7,035,946 B2 | * | 4/2006 | Song et al. ..................... 710/10 |
| 7,093,151 B1 | * | 8/2006 | Williams ..................... 713/500 |

* cited by examiner

*Primary Examiner*—Thomas Lee
*Assistant Examiner*—Vincent T Tran
(74) *Attorney, Agent, or Firm*—Rosenberg, Klein & Lee

(57) ABSTRACT

An ultrawideband (UWB) frequency-tracking method and related device are provided. The method includes the following steps: (a) using an initial frequency seed to automatically track and compensate the clock signal of the USB peripheral device; (b) determining whether the automatic tracking and compensating of the clock signal is successful, for example, within a pre-defined duration; (c) if not successful in step (b), setting a new frequency seed; (d) setting the USB peripheral device off-line; and (e) reconnecting the USB peripheral device and using the new frequency seed to perform the tracking and compensating of the clock signal. The setting off-line step is to disable the pull-up resistor of the D+ signal or the pull-up resistor of the D– signal of the USB peripheral device so that the USB peripheral device becomes off-line.

16 Claims, 5 Drawing Sheets

METHOD AND DEVICE FOR ULTRAWIDEBAND FREQUENCY TRACKING

BACKGROUND OF THE INVENTION

1. Field of the Invention

The present invention relates to a method and device for ultrawideband frequency-tracking and, more particularly, to a multi-band frequency-tracking method and device for use in USB peripheral.

2. The Related Art

USB (Universal Serial Bus) ports of a computer are used to connect many USB peripherals, including USB keyboard, USB mouse, USB card reader, USB flash drive, external USB hard disk, USB printer, and USB scanner. The USB ports provide convenience to the users. The transmission speed of USB has also evolved from the 12 Mbps of USB 1.1 up to 480 Mbps of USB2.0.

According to the transmission specification of the USB, USB 1.1 can support low speed peripherals, such as USB keyboard, USB mouse, and USB joy stick, whose transmission speed is 1.5 Mbps with the tolerance of 1.5%, and the full speed peripherals, such as USB flash drive, USB printer, and USB scanner, whose transmission speed is 12 Mbps with a tolerance of 0.25%. On the other hand, USB2.0 is capable of supporting high speed peripherals, whose transmission speed is as high as 480 Mbps. USB 2.0 is downward compatible with USB1.1, therefore, USB2.0 can support low speed, full speed and high speed peripherals.

FIG. 1 shows a block diagram of a USB low speed controller according to the prior art. The USB low speed controller 100 requires an external precise crystal oscillator 120, or a ceramic resonator, and external large-capacitance capacitors C1, and C2, to cooperate with its internal auxiliary resonant circuit 101 to generate the CLK clock signal for operating the internal clock extracting circuit 102 of the low speed controller 100. For example, the CLK clock frequency is 6 MHz, four times oversampling frequency. Alternatively, the low speed controller 100 can utilize the crystal oscillator to generate a 1.5 MHz clock frequency, and utilize a phase lock loop (PLL) to sample the frequency with internal multiple of the clock frequency. The transceiver 101 couples with the USB port of the host. The transceiver 104 transceives the differential signal D+/D−, also called a data flow. When the transceiver 104 receives the differential signal D+/D− from the host, it outputs the differential signal RXD+/RXD− and NRZI-coded RXD data signal to the serial interface engine (SIE) 106. The NRZI-coded RXD data signals are also transmitted to the clock extracting circuit 102. The clock extracting circuit 102 utilizes the CLK clock to oversample the RXD data, and extract the 1.5 MHz SIECLK clock information hidden in the differential signal for the SIE 106. The SIE 106 utilizes the SIECLK clock to retrieve the digital signal information from the RXD data signals. Otherwise, the transceiver 104 receives the differential signal TXD+/TDX− from the SIE 106, and transmits the same to the host. The SIE 106 controls the operation of the transceiver 104. The external crystal oscillator or the external ceramic resonator is an additional expense for the USB mouse manufacturers.

FIG. 2 shows a typical oscillator circuit utilizing an inverter buffer 200 and a feedback resistor R, and utilizing a current control, voltage control, or capacitance control trimming circuit 220 to properly adjust the oscillating frequency. For example, a plurality of capacitors C, 2C, 4C, 8C, 16C and semiconductor switches are utilized to form different combinations in order to generate suitable oscillating signal S with the frequency f. A trimming circuit 220 is required to fine tune the oscillating frequency. In this circuit, trimming circuit 220 is an adjustable capacitor. Persons skilled in semiconductor manufacturing should understand that the resistor and the capacitors of the circuit, while integrated into IC, depend on the doping density, process drift and the temperature during the manufacturing process. The drift of the oscillating frequency f can be as high as 50%. A frequency drift of this magnitude usually requires a more expensive and time-consuming method, such as, laser trim, fuse, or one time programmable (OTP), to tune it back to within the trackable and lockable frequency range, for example, ±5% or ±10%, so that it is possible to track the correct frequency.

The speed of the USB devices can be determined by the termination status. Taking USB low speed device and USB full speed device as an example, as shown in FIG. 3 of the attached drawings, in accordance with USB specification, the voltages at the D+ and D− lines of the host side USB controller 310, called down stream USB controller, are pulled down to ground through the pull-down resistors Rpd, and the voltage of the D− line of the device side USB controller 320, called up stream USB controller, is pulled up to V33 (V33=3.3V) through the pull-up resistor Rpu, where Rpd and Rpu have the resistance of 15 KOhm±5% and 1.5 KOhm±15%, respectively. The host can therefore detect that the device is a USB low speed device. On the other hand, the voltages at the D+ and D− lines of the host side USB controller 310, called down stream USB controller, are pulled down to ground through the pull-down resistors Rpd, and the voltage of the D+ line of the device side USB controller 320, called up stream USB controller, is pulled up to V33 (V33=3.3V) through the pull-up resistor Rpu, where Rpd and Rpu have the resistance of 15 KOhm±5% and 1.5 KOhm±5%, respectively. The host can therefore detect that the device is a USB full speed device.

For USB2.0, the host side USB controller preferably supports low speed, full speed and high speed transmission modes, and the device side USB controller at least support full speed and high speed transmission modes. When both USB controllers are first connected, the USB transmission mode is determined to be low speed if the host detects that the device USB is low speed. As shown in FIG. 4, if the host detects that the device USB is in the USB full speed termination status, the host will further detect if the K-J-K-J-K-J sequence shows up on the D+, and D− lines at the device end for more than 1 ms. If so, the pin of the general purpose I/O (GPIO) and switch SW are used to disconnect the pull-up resistor Rpu from the D+ line. A so-called USB high speed transmission mode is formed.

The USB specification includes several types of packets to facilitate all types of transactions. A token packet comprises a PID field, an ADDR field, and ENDP field, and a CRC4 field. The typical width of the PID field is 8 bits, for indicating the packet format, such as, IN, OUT, or SETUP. The ADDR field and the ENDP field are for indicating the endpoint address. The CRC5 field is a 5-bit field for cyclic redundant code. The host sends token packets to inform the endpoint whether a read or a write transaction is performed. If it is a write transaction, the host will send the data packets to the endpoint, otherwise, the endpoint will send to the host.

SUMMARY OF THE INVENTION

The present invention discloses an ultrawideband (UWB) frequency-tracking method, including the following steps:

(a) using an initial frequency seed to automatically track and compensate the clock signal of the USB peripheral device; (b) determining whether the automatic tracking and compensating of the clock signal is successful, for example, within a pre-defined duration; (c) if not successful in step (b), setting a new frequency seed; (d) setting the USB peripheral device off-line; and (e) reconnecting the USB peripheral device and using the new frequency seed to perform the tracking and compensating of the clock signal. The setting off-line step is to disable the pull-up resistor of the D+ signal or the pull-up resistor of the D– signal of the USB peripheral device so that the USB peripheral device becomes off-line.

The present invention also discloses an ultrawideband (UWB) frequency-tracking device, including an oscillator capable of automatic tracking and compensating of a clock signal; a controlled pull-up resistor having a first end, a second end, and a third end; and a time-out circuit, coupled to the oscillator, for issuing a time-out signal when the oscillator failing to automatically track and compensate the clock signal within a pre-defined duration. The oscillator, based on a token packet, automatically tracks and compensates the clock signal generated according to a frequency seed. The first end of the pull-up resistor is coupled to the voltage source, the second end is for the enable/disable control of the pull-up resistor, and the third end is connected to the D+ or D– signal transmitted by the USB device.

The present invention further discloses an UWB frequency-tracking device, including an oscillator capable of automatic tracking and compensating of a clock signal; and a time-out circuit, coupled to the oscillator, for issuing a time-out signal when the oscillator failing to automatically track and compensate the clock signal within a pre-defined duration. The oscillator, based on a token packet, automatically tracks and compensates the clock signal generated according to a frequency seed. When the time-out circuit asserts a time-out signal, the oscillator updates the frequency seed, generates a new clock signal based on the new frequency seed, and automatically tracks and compensates the clock signal according to a new token packet.

The present invention also discloses a read-only-memory (ROM) IC, including a ROM for non-volatile recording of a firmware and a frequency seed for the IC operation; and an oscillator capable of automatic tracking and compensating of a clock signal. The oscillator has a first register and a second register. The oscillator uses the first and second registers to generate a clock signal, and then uses a token packet to track and compensate the clock signal up to a pre-defined duration. The initial value of the first register is the frequency seed recorded by the ROM. If the tracking and compensating is not completed successfully when the pre-defined duration is up, the IC circuit uses the firmware to update the first register and restarts the automatic tracking and compensating of the clock signal. The ROM of the present invention is suitable for USB low speed, full speed, and high speed transmission.

These and other objects, features and advantages of the invention will be apparent to those skilled in the art, from a reading of the following brief description of the drawings, the detailed description of the preferred embodiment, and the appended claims.

DETAILED DESCRIPTION OF THE PREFERRED EMBODIMENT AND THE BEST MODE FOR CARRYING OUT THE PRESENT INVENTION

Figure 1:
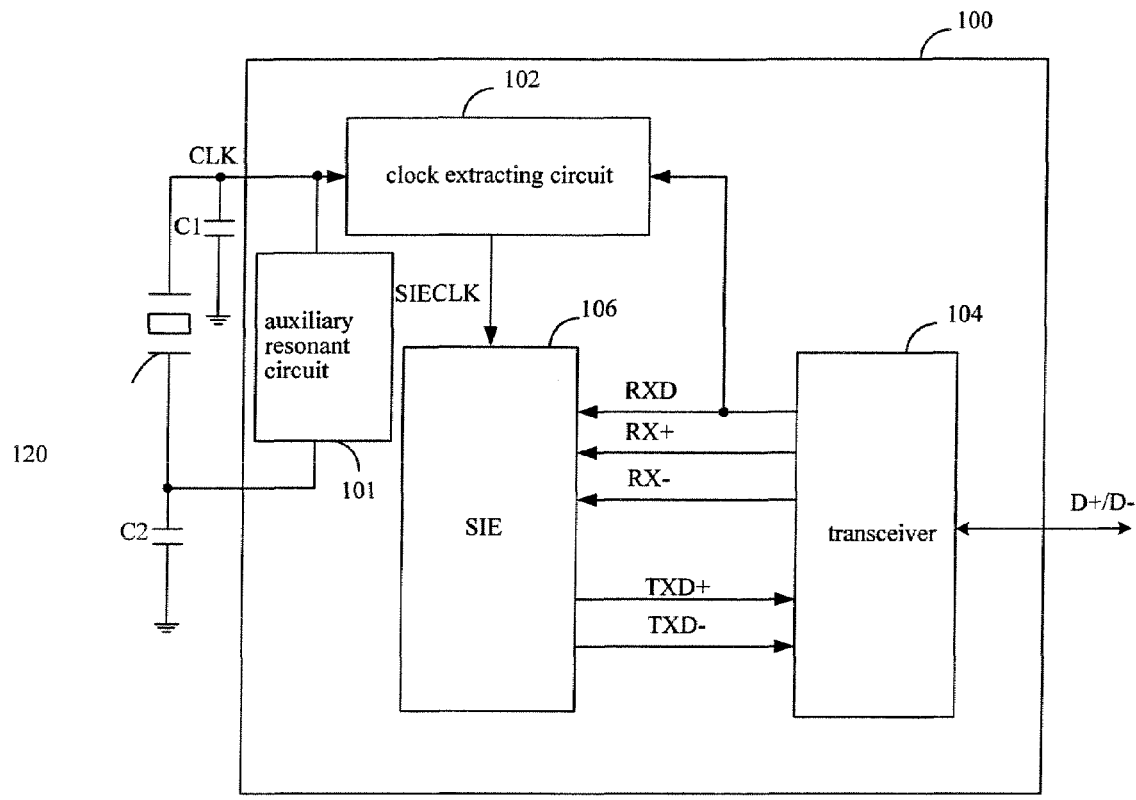
FIG. 1 shows a block diagram of a conventional USB controller.
Figure 2:
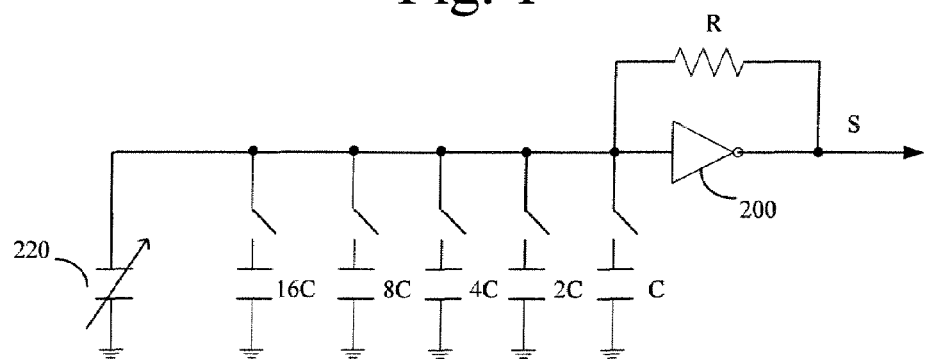
FIG. 2 shows a conventional oscillator circuit.
Figure 3:
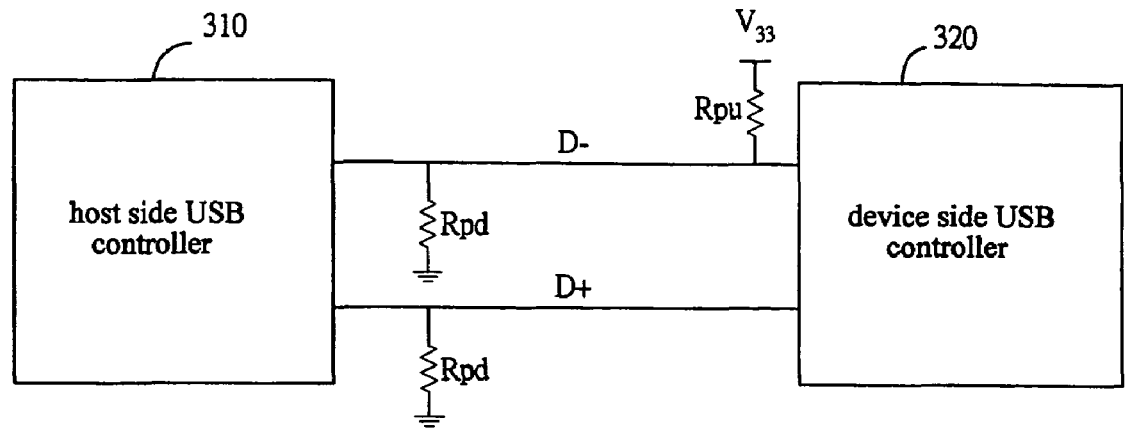
FIG. 3 shows a termination connection of a USB device using a low speed transmission.
Figure 4:
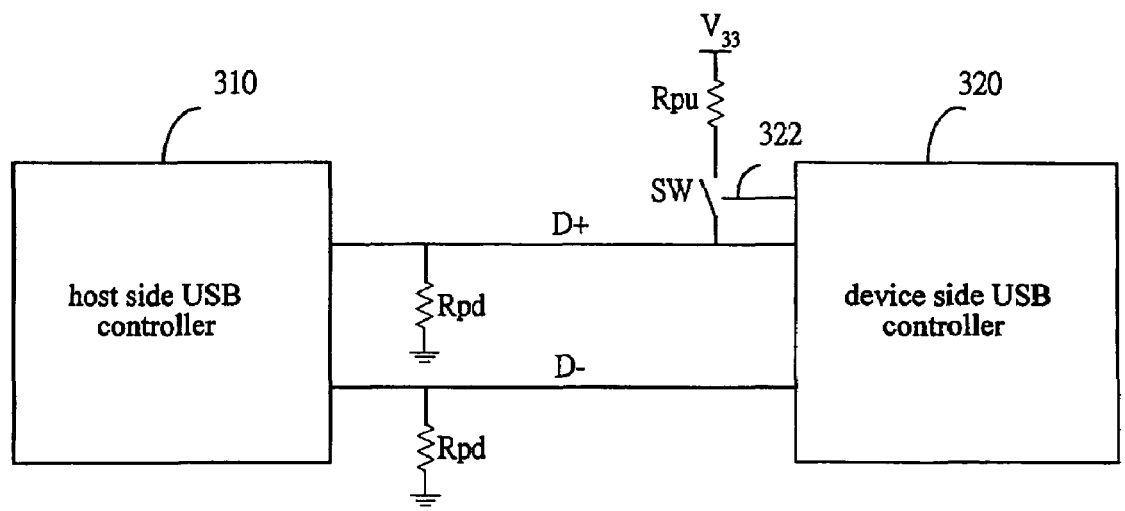
FIG. 4 shows a termination connection of a USB device using a full speed or high speed transmission.
Figure 5:
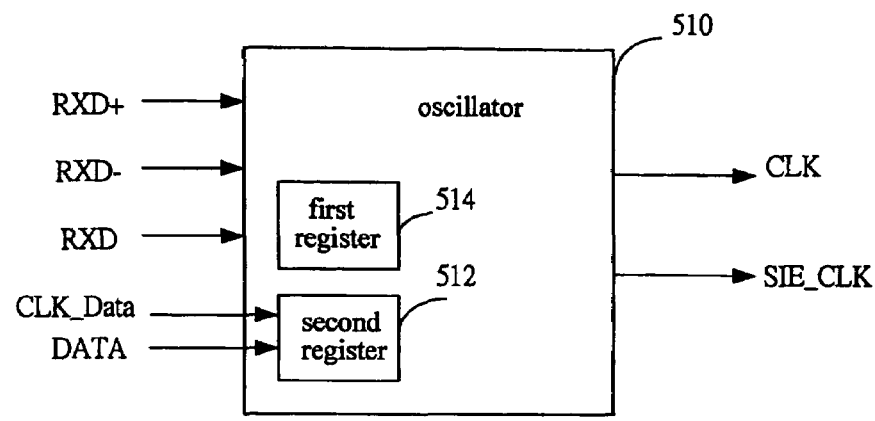
FIG. 5 shows a block diagram of an oscillator capable of automatically tracking and compensating the clock frequency.

With reference to the drawings and in particular to FIG. 5, a block diagram of an oscillator 510 is shown, which is capable of automatic tracking and compensating of a clock frequency. Preferably integrated into an IC, oscillator 510 has a first register 512 and a second register 514. Oscillator 510 uses a clock signal (CLK_Data) and a DATA signal to write a frequency seed into first register 512. Oscillator 510 has an initial frequency in response to the frequency seed. However, because of the manufacturing process variation, the initial frequency will not be the value as expected. Oscillator 510 uses the RXD+, RXD– and RXD from the transceiver, where the RXD+ and RXD– are the D+ and D– transmission lines of the USB device, and RXD is the NRZI encoded signal corresponding to the D+ and D– signals. By using the token packet transmitted by the D+ and D– signals, and by the automatic tracking and compensating operation of oscillator 510, the suitable corrected value can be calculated and stored into second register 514, according to the initial frequency value. Using the values stored in first register 512 while initialized and second register 514, oscillator 510 generates the CLK signal matching the tolerance and the SIE_CLK signal for the internal operation of the IC. The SIE_CLK signal is a multiple of the CLK signal, and the SIE_CLK signal is the clock signal hidden in the token packet. The simulated results confirm that this can automatically adjust the frequency shift about ±20% of the initial frequency. It should be noted that the aforementioned embodiment utilizes two registers and the first register can be an initial reset value for the second register. For those with ordinary skills in this area can easily modify the design as a single register.

Figure 6:
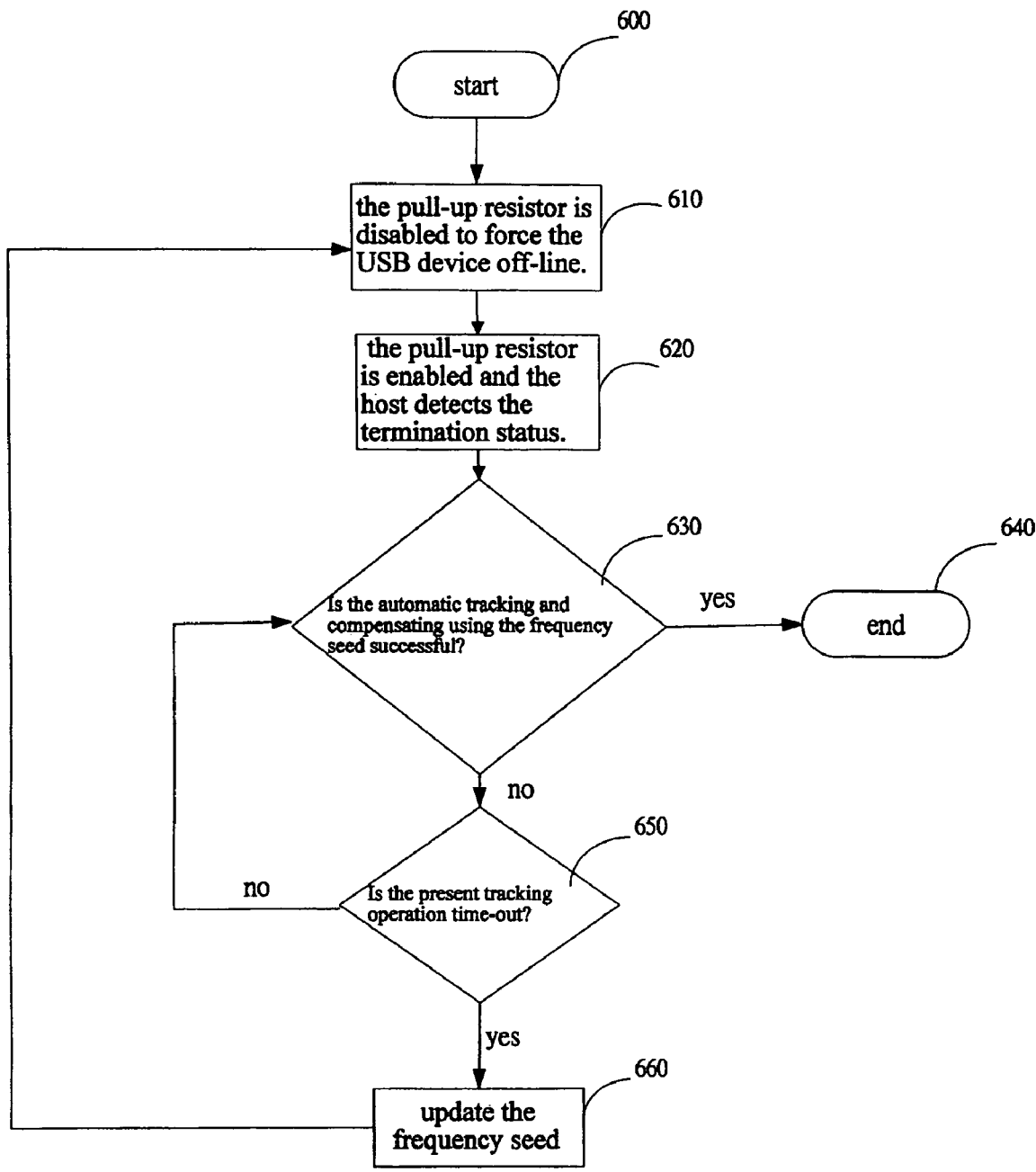
FIG. 6 shows a flowchart of the ultrawideband frequency-tracking method of the present invention.

FIG. 6 shows a flowchart of the frequency-tracking according to one embodiment of the present invention. The flowchart starts with step 600. In step 610, the pull-up resistor is disabled to force the USB device off-line. In step 620, the pull-up resistor is enabled and the host detects the termination status. Step 630 is to determine if the automatic tracking and compensating using the frequency seed is successful. If so, the process succeeds and terminates with the step 640; otherwise, the process takes step 650 to check if the present tracking operation is time-out. If it is not time-out yet, return to step 630; otherwise, proceed to step 660 to update the frequency seed and return to step 610, which is to disable the pull-up resistor and force the USB device off-line. Then, the automatic tracking and compensating operation restarts. The update of the frequency seed implies the update of the initial frequency of the USB device. Every time the frequency seed is updated, the oscillator in FIG. 5 can be used to adjust the frequency shift about ±20% of the initial frequency.

Figure 7:
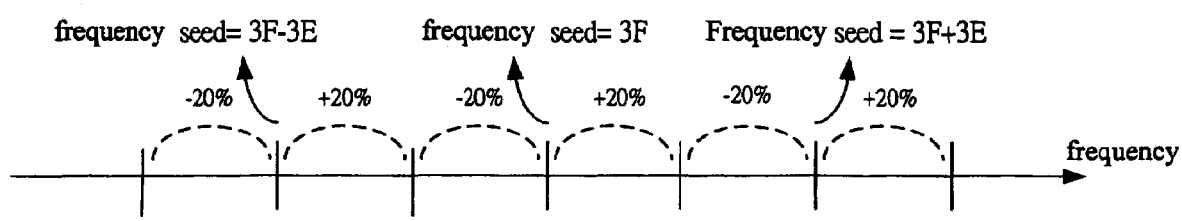
FIG. 7 shows a schematic view of three operations of the frequency-tracking method disclosed in FIG. 6.

FIG. 7 shows a schematic diagram of three frequency-tracking operations with different frequency seeds performed in the method shown in FIG. 6 according to one embodiment of the present invention. The frequency seed is 3F at first to correspond to the central frequency 3F of the automatic tracking and compensating within ±20%. Then, the frequency seed is changed to (3F+3E) to correspond to the central frequency (3F+3E) of the automatic tracking and compensating within ±20%. Finally, the frequency seed is changed to (3F−3E) to correspond to the central frequency (3F−3E) of the automatic tracking and compensating within ±20%. The overall frequency shift will be about ±60%. The relationship among the frequency seeds can vary in accordance with the hardware design. For example, preferably, the ranges of the frequency seeds can slightly overlap with each other.

The present invention can be used in designing an oscillator integrated in an IC ranging from 6 MHz to 24 MHz, for example, the ultrawideband ranging from 5 MHz to 25 MHz. This is because the transmission speed for USB low speed and full speed transmission is 1.5 Mbps and 12 Mbps, respectively. However, their internal operating frequency can fall within the range of 6 MHz and 24 MHz, depending on their design. By using the present invention, the oscillator integrated in the IC can correctly tracking frequency ranging from 6 MHz to 24 MHz; therefore, all the USB devices using low speed and full speed transmission are covered, including a wide range of USB device, such as USB keyboard, USB mouse, USB card-reader, USB flash memory, add-on USB hard disk, USB printer and USB scanner.

The following table shows a preferred embodiment in accordance with the aforementioned design concept. It shows that a plurality of design parameters can be provided to the designer to meet different requirements. The parameters include the oscillator type, system frequency, and the number of division frequency. For example, the hardware design only needs to select the oscillator type to be built-in with a system frequency of 6 MHz. If the operating frequency of the corresponding serial interface engine (SIE) is 1.5 MHz, the number of the division frequency should be four in order to establish a four-time frequency oversampling structure. Of course, the multiple of oversampling can vary instead of 4. If the frequency seed is 3F, the corresponding central frequency is about 5.5 MHz, and about ±20% can be compensated according to the token packet, the will be locked about 6 MHz. Divided by four, the frequency at 1.5 MHz is provided to the SIE operation. The add-on oscillator type is reserved for the flexibility of the system designers.

| Oscillator Type | System Frequency | Number of Frequency Division |
|---|---|---|
| Built-in | 6 MHz | 1 |
| Add-on | 12 MHz | 2 |
|  | 18 MHz | 3 |
|  | 24 MHz | 4 |

Figure 8:
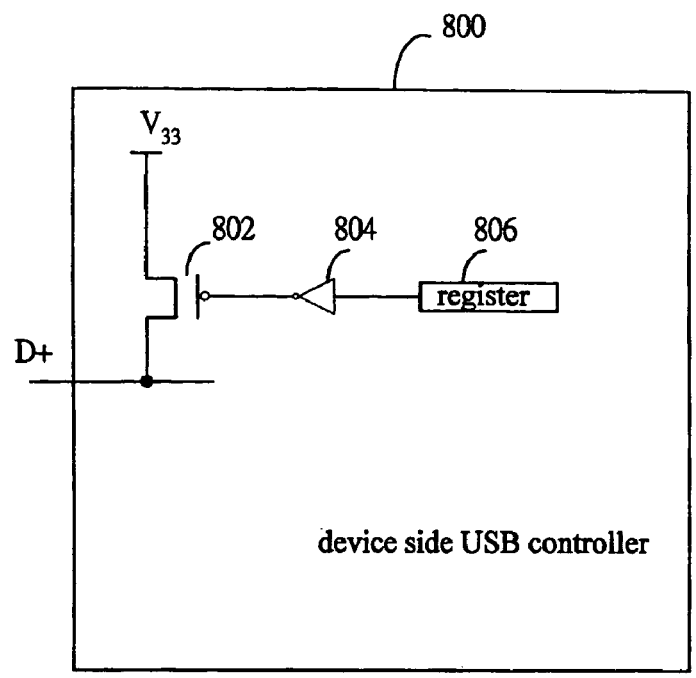
FIG. 8 shows a termination circuit of the D+ signal of the IC in accordance with FIG. 6.

FIG. 8 shows an exemplary termination circuit of the D+ signal used in the IC in accordance with the low speed USB device of FIG. 6. It is entirely built-in inside a device side USB controller 800. In this embodiment, a p-type MOS (PMOS) field-effect transistor 802 is formed during the semiconductor manufacturing process. The drain of transistor 802 is coupled to D+ signal, and the source is coupled to V33. A register 806 is used to couple to inverter 804. The output of inverter 804 is coupled to the gate PMOS transistor 802. The value written by the firmware into register 806 can be used to control the ON and OFF of PMOS transistor 802. When PMOS transistor 802 is ON, by controlling the manufacturing process, the pull-up resistor Rpu of 1.5 KOhm±5% is pulled up to V33. That is, in this embodiment, the firmware writes "1" into register 806 so that the D+ signal forms a full speed termination connection for the device USB controller. On the other hand, the firmware writes "0" into register 806 so that PMOS transistor 802 is OFF and the D+ signal does not pull up resistor Rpu, which leads to an off-line termination connection for the device USB controller. Alternatively, when the host successfully detects the device USB to be in the full speed termination state, the host will issue a [K-J-K-J-K-J] sequence for a pre-defined duration. When the device detects the [K-J-K-J-K-J] sequence for more than 1.0 m-second, the firmware in the device USB controller will write "0" into register 806 and shut off PMOS transistor 802; so that D+ signal does not pull up resistor Rpu, and a high speed termination connection is formed without using any GPIO pin or any external circuit area. The aforementioned embodiment uses the termination circuit design of the D+ signal to explain. It is worth noticing that a D− signal on the USB controller can also be used to disable the pull-up resistor for force the off-line and restarting of the tracking and compensating operation.

Figure 9:
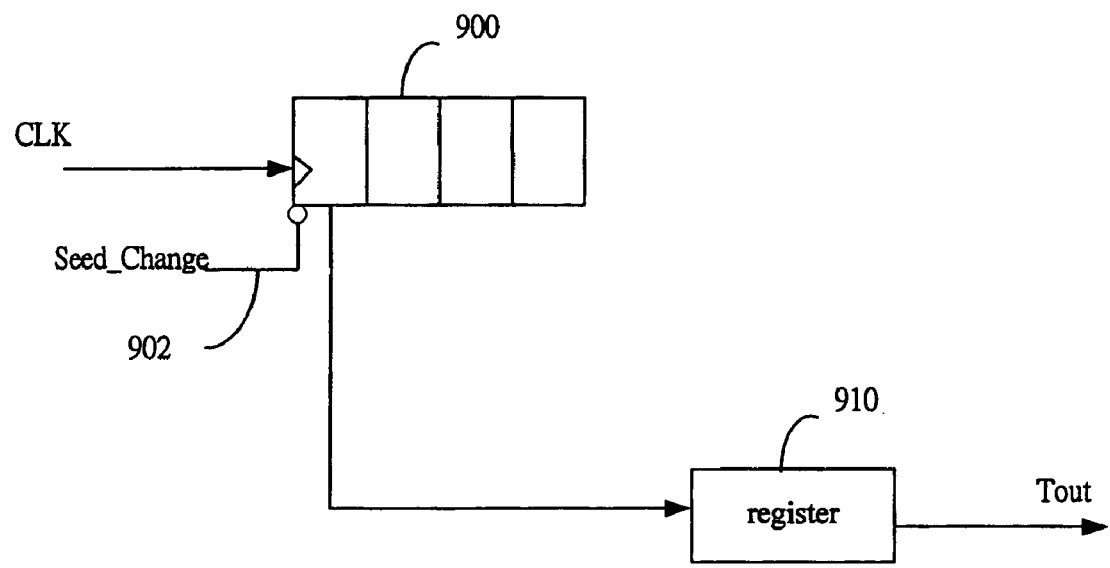
FIG. 9 shows a time-out circuit in accordance with FIG. 6.

FIG. 9 shows the time-out circuit of FIG. 6. The circuit designer can choose a counter 900 of suitable length to respond to the CLK signal. Preferably, the CLK signal is obtained by the automatic tracking and compensating based on the current frequency seed. It takes a period of time to perform the tracking and compensating. Tout stored in register 910 can tell if the current frequency tracking is time-out, and the Freq_OK signal (not shown) tells if the CLK signal matches the system requirement. In this embodiment, the Tout and Fre_OK signals are used by the system to determine whether the tracking and compensating operation is successful. If not, the system can write another suitable frequency seed, force the USB device off-line (as shown in FIG. 8), and restart another tracking and compensating operation. In the mean time, the system can use a Seed-Change signal to reset counter 900 to indicate that the frequency seed is changed and the tracking is restarted.

Because the IC manufacturing process may cause the built-in RC oscillator to shift as high as 50%, the present invention can be used to compensate and adjust the frequency shift up to 300%. For example, for a USB device, the four-time oversampling rate can correct the 18 MHz back to 6 MHz. Although during the process the device are disconnected and reconnected several times, the user can hardly detect as the delay is at most 1-2 seconds. The present invention, however, greatly benefits hardware manufacturers since the present invention does not require the expensive add-on precise oscillator, man power, programmable non-volatile memory or laser trimming. The present invention can be directly used in the semiconductor manufacturing process by applying a mask to write a firmware into a ROM in the IC and using the initial frequency to lock in the suitable operating frequency. The same built-in RC oscillator can be used in a wide range of IC, and is suitable for different types of products and frequencies. That is, the present invention is particularly suitable for low-cost ROM-type ICs.

In summary, the present invention discloses an ultrawideband frequency-tracking method, including the following steps: (a) using an initial frequency seed to automatically track and compensate the clock signal of the USB peripheral device; (b) determining whether the automatic tracking and compensating of the clock signal is successful, for example, within a pre-defined duration; (c) if not successful in step (b), setting a new frequency seed; setting the USB peripheral device off-line; and (d) reconnecting the USB peripheral device and using the new frequency seed to perform the tracking and compensating of the clock signal. The setting off-line step is to disable the pull-up resistor of the D+ signal or the pull-up resistor of the D– signal of the USB peripheral device which depends on the type of USB device so that the USB peripheral device becomes off-line.

The present invention also discloses an ultrawideband (UWB) frequency-tracking device, including an oscillator capable of automatic tracking and compensating of a clock signal; a controlled pull-up resistor having a first end, a second end, and a third end; and a time-out circuit, coupled to the oscillator, for issuing a time-out signal when the oscillator failing to automatically track and compensate the clock signal within a pre-defined duration. The oscillator, based on a token packet, automatically tracks and compensates the clock signal generated according to a frequency seed. The first end of the pull-up resistor is coupled to the voltage source, the second end is for the enable/disable control of the pull-up resistor, and the third end is connected to the D+ or D– signal transmitted by the USB device.

The present invention further discloses an UWB frequency-tracking device, including an oscillator capable of automatic tracking and compensating of a clock signal; and a time-out circuit, coupled to the oscillator, for issuing a time-out signal when the oscillator failing to automatically track and compensate the clock signal within a pre-defined duration. The oscillator, based on the token packets, automatically tracks and compensates the clock signal generated according to a frequency seed. When the time-out circuit asserts a time-out signal, the oscillator updates the frequency seed, generates a new clock signal based on the new frequency seed, and automatically tracks and compensates the clock signal according to the new coming token packets. It should be noted that the first register can be the initial value of the second register.

The present invention also discloses a read-only-memory (ROM) IC, including a ROM for non-volatile recording of a firmware and a frequency seed for the IC operation; and an oscillator capable of automatic tracking and compensating of a clock signal. The oscillator has a first register and a second register. The oscillator uses the first and second registers to generate a clock signal, and then uses a token packet to track and compensate the clock signal up to a pre-defined duration. The initial value of the first register is the frequency seed recorded by the ROM. If the tracking and compensating is not completed successfully when the pre-defined duration is up, the IC circuit uses the firmware to update the first register and restarts the automatic tracking and compensating of the clock signal. The ROM of the present invention is suitable for USB low speed, full speed, and high speed transmission.

While the invention has been described in connection with what is presently considered to the most practical and preferred embodiment and the best mode thereof, it is to be understood that the invention is not to be limited to the disclosed embodiment, but on the contrary, is intended to cover various modifications and equivalent arrangement included within the spirit and scope of the appended claims.

What is claimed is:

1. A method for ultrawideband frequency-tracking, comprising the steps of:
   (a) automatically tracking and compensating a clock signal of an IC according to an initial frequency seed, said IC being a USB controller;
   (b) determining whether tracking and compensating said clock signal is successful using a token packet transmitted on USB data lines during an initialization period;
   (c) if not successful in step (b), updating the frequency seed;
   (d) setting said USB controller off-line, said step of setting said USB controller off-line includes the step of disabling a pull-up resistor of a D+ signal of said USB controller so that said USB controller becomes off-line; and
   (e) reconnecting said IC and using said new frequency seed to perform said tracking and compensating of said clock signal.

2. The method as claimed in claim 1, wherein said step (b) determines if said tracking and compensating is successfully performed within a pre-defined duration.

3. The method as claimed in claim 1, wherein said USB controller has a read-only memory (ROM) for non-volatile recording of a firmware to generate an initial frequency of said clock signal.

4. The method as claimed in claim 1, wherein said automatic tracking and compensating step is done by receiving a token packet.

5. A method for ultrawideband frequency-tracking, comprising the steps of:
   (a) automatically tracking and compensating a clock signal of an IC according to an initial frequency seed, said IC being a USB controller;
   (b) determining whether tracking and compensating said clock signal is successful using a token packet transmitted on USB data lines during an initialization period;
   (c) if not successful in step (b), updating the frequency seed;
   (d) setting said USB controller off-line, said setting said USB controller off-line includes the step of disabling a pull-up resistor of a D– signal of said USB controller so that said USB controller becomes off-line; and
   (e) reconnecting said IC and using said new frequency seed to perform said tracking and compensating of said clock signal.

6. A device for frequency-tracking, comprising:
   an oscillator capable of automatically tracking and compensating a clock signal, said oscillator generating said clock signal according to a frequency seed and a token packet;
   a controlled pull-up device having a first end, a second end, and a third end, said first end being coupled to a voltage source, said second end being used for alternatively enabling and disabling said pull-up device, said second end of said controlled pull-up device being coupled to a register, said register being written into to control said enable/disable of said pull-up device; and
   a time-out circuit coupled to said oscillator for receiving said clock signal, said time-out circuit asserting a time-out signal when said oscillator fails to automatically track and compensate said clock signal within a predetermined duration.

7. The device as claimed in claim 6, wherein said third end of said controlled pull-up device is connected to the D+ signal transmitted by a USB device.

8. The device as claimed in claim 6, wherein said third end of said controlled pull-up device is connected to the D− signal transmitted by a USB device.

9. The device as claimed in claim 6, wherein said controlled pull-up device includes a transistor.

10. The device as claimed in claim 6, wherein said controlled pull-up device includes a p-type MOS (PMOS) field-effect transistor.

11. The device as claimed in claim 6, wherein said controlled pull-up device includes an n-type MOS (NMOS) field-effect transistor.

12. The device as claimed in claim 6, wherein said oscillator updates said frequency seed to generate a new clock signal, and uses a second token packet to track and compensate said new clock signal.

13. A device for frequency-tracking, comprising:
an oscillator capable of automatically tracking and compensating a clock signal, said oscillator generating said clock signal according to a frequency seed and a token packet, said oscillator updates said frequency seed to generate a new clock signal, and uses a second token packet to track and compensate said new clock signal;
a controlled pull-up device having a first end, a second end, and a third end, said first end being coupled to a voltage source, said second end being used for alternatively enabling and disabling said pull-up device; and
a time-out circuit coupled to said oscillator for receiving said clock signal, said time-out circuit asserting a time-out signal when said oscillator fails to automatically track and compensate said clock signal within a predetermined duration, said time-out circuit including a counter for counting a number in accordance with said clock signal.

14. The device as claimed in claim 13, wherein said counter is reset when said frequency seed is updated.

15. A device for frequency-tracking, comprising:
an oscillator capable of automatically tracking and compensating a clock signal, said oscillator generating said clock signal according to a frequency seed and a token packet; and
a time-out circuit coupled to said oscillator for receiving said clock signal, said time-out circuit asserting a time-out signal when said oscillator fails to automatically track and compensate said clock signal within a predetermined duration, said time-out circuit including a counter for counting a number according to said clock signal, and said counter being reset when said frequency seed is updated;
wherein when said time-out circuit asserts said time-out signal, said oscillator updates said frequency seed in response to said time-out signal, said oscillator generates a new clock signal based on said new frequency seed, and automatically tracks and compensates said clock signal according to another token packet.

16. A device for frequency-tracking, comprising:
an oscillator capable of automatically tracking and compensating a clock signal, said oscillator generating said clock signal according to a frequency seed and a token packet; and
a time-out circuit coupled to said oscillator for receiving said clock signal, said time-out circuit asserting a time-out signal when said oscillator fails to automatically track and compensate said clock signal within a predetermined duration;
wherein when said time-out circuit asserts said time-out signal, said oscillator updates said frequency seed in response to said time-out signal, said oscillator generates a new clock signal based on said new frequency seed, and automatically tracks and compensates said clock signal according to another token packet, and wherein said device is coupled to an external switch, and said external switch is coupled to a pull-up resistor and a D+ signal transmitted by a USB device.

* * * * *